(12) United States Patent
Valdez et al.

(10) Patent No.: US 11,575,432 B1
(45) Date of Patent: Feb. 7, 2023

(54) SYSTEMS AND METHODS FOR MAINTAINING EQUIPMENT OF A PASSIVE OPTICAL NETWORK

(71) Applicant: FRONTIER COMMUNICATIONS HOLDINGS, LLC, Norwalk, CT (US)

(72) Inventors: John Valdez, Copper Canyon, TX (US); Bryan Pauling, Rochester, NY (US)

(73) Assignee: FRONTIER COMMUNICATIONS HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/891,879

(22) Filed: Aug. 19, 2022

(51) Int. Cl.
*H04B 10/077* (2013.01)
*H04B 10/67* (2013.01)
*H04B 10/079* (2013.01)

(52) U.S. Cl.
CPC ..... *H04B 10/0771* (2013.01); *H04B 10/0795* (2013.01); *H04B 10/674* (2013.01)

(58) Field of Classification Search
None
See application file for complete search history.

(56) References Cited

U.S. PATENT DOCUMENTS

| | | | | |
|---|---|---|---|---|
| 2005/0198272 A1* | 9/2005 | Bernard | ............. | H04Q 11/0067 709/224 |
| 2009/0269053 A1* | 10/2009 | Yang | ................... | H04L 41/0677 398/22 |
| 2013/0322869 A1* | 12/2013 | Hirth | ................... | H04Q 11/0067 398/16 |
| 2014/0003804 A1* | 1/2014 | Fargano | ............. | H04B 10/0791 398/13 |
| 2014/0056582 A1* | 2/2014 | Roberts | ............ | H04B 10/07955 398/28 |

\* cited by examiner

*Primary Examiner* — David W Lambert
(74) *Attorney, Agent, or Firm* — Marshall, Gerstein & Borun LLP

(57) ABSTRACT

Techniques for maintaining equipment of a PON include determining a current optical profile for each segment of a plurality of segments of a PON, and detecting that the current optical profile of a particular segment is outside of a designated operating range. Based on the detection, drifts over time of the optical profile of the segment and of optical profiles of one or more other segments that share respective common endpoints with the segment are determined and compared, and based on the comparison, a component of the PON (e.g., an endpoint or an optical fiber) is identified as requiring maintenance. Each segment's optical profile corresponds to characteristics of optical signals delivered over the segment (e.g., attenuation, changes in frequencies, changes in power outputs, etc.), and current optical profiles of the PON's segments may be repeatedly updated over time to continuously monitor for components that need maintenance.

30 Claims, 5 Drawing Sheets

SYSTEMS AND METHODS FOR MAINTAINING EQUIPMENT OF A PASSIVE OPTICAL NETWORK

CROSS-REFERENCE TO RELATED APPLICATIONS

This application is related to U.S. patent application Ser. No. 17/891,776, filed on Aug. 19, 2022 and entitled "Systems and Methods for Identifying a Source of a Degradation in a Passive Optical Network", U.S. patent application Ser. No. 17/891,834, filed on Aug. 19, 2022 and entitled "Systems and Methods for Identifying a Source of Degradation in a Passive Optical Network", and U.S. patent application Ser. No. 17/891,911, filed on Aug. 19, 2022 and entitled "Systems and Methods for Predicting Times-to-Failure of Passive Optical Network Components", the disclosures of which are incorporated herein in their entireties.

FIELD OF THE DISCLOSURE

This disclosure relates generally to passive optical networks, and, more particularly, to systems and methods for identifying or determining a source of a detected degradation in a passive optical network.

BACKGROUND

A conventional passive optical network (PON) includes one or more optical line terminals (OLTs) at a central location connecting to one or more optical last mile termination units disposed at respective customer premises via one or more optical fibers. A PON is typically implemented using a point-to-multipoint topology in which a feeder optical fiber from an OLT serves multiple optical network terminals (ONTs) or optical network units (ONUs) via respective distribution optical fibers. Typically, the feeder optical fiber is optically coupled to distribution optical fibers for respective ones of the last mile termination units via a fiber distribution hub (FDH) using an optical splitter.

Often, the effects of degradations within the PON are observed by customers or end-users at locations at which last mile termination units are disposed. For example, a customer may observe a slowing down or lack of fidelity of PON services at his or her location, and may contact the PON service provider for assistance. In attempting to resolve the issue, as technicians of the PON typically troubleshoot only the single optical path via which the last mile termination unit at the customer's premises receives optical services (e.g., the optical path from the OLT to the last mile termination unit at the customer's premises), technicians frequently misdiagnose the source of the observed degradation as being the last mile termination unit disposed at the customer premises. However, the last mile termination unit may be operating properly and the source of the observed degradation may instead be elsewhere within the PON. For example, the degradation may be caused by dirty or faulty optical fibers via which the optical signals are delivered to the last mile termination unit at the customer location, by a faulty intermediate node (such as the FDH) within the PON, and/or even by faults or degradations within the OLT equipment, any of which can present as degradations observed at the last mile termination unit at the customer's premises. The technician is not able to accurately and quickly identify these other possible sources of the observed degradation.

In an embodiment, a system for maintaining equipment of a passive optical network (PON) includes one or more processors, one or more memories, and computer-executable instructions stored on the one or more memories that, when executed by the one or more processors, cause the system to determine, for each segment of a plurality of segments of the PON, a respective, current optical profile based on a characteristic of optical signals delivered over the each segment and detect that the current optical profile of a particular segment of the plurality of segments is above or below a designated operating range of an optical profile of the PON. The computer-executable instructions are further executable to, responsive to the detection, determine a drift over time of the respective optical profile of the particular segment based on the current optical profile and one or more historical optical profiles of the particular segment, determine a respective drift over time of the respective optical profile of each segment included in one or more other segments of the PON based on respective historical profiles of the each segment, the each segment sharing a respective common endpoint with the particular segment; and compare the drift over time of the respective optical profile of the particular segment and respective drifts over time of the respective optical profiles of the one or more other segments of the PON. Additionally, the computer-executable instructions are executable to identify, based on the comparison, a component of the PON as requiring maintenance, the identified component being a specific segment endpoint or a specific optical fiber of the PON, and notify at least one of a user interface or another computing device that the identified component of the PON requires maintenance.

SUMMARY

In an embodiment, a method of maintaining equipment of a passive optical network (PON) includes determining, for each segment of a plurality of segments of the PON, a respective, current optical profile based on a characteristic of optical signals delivered over the each segment, and detecting that the current optical profile of a particular segment of the plurality of segments is above or below a designated operating range of an optical profile of the PON. The method also includes, responsive to the detection, determining a drift over time of the respective optical profile of the particular segment based on the current optical profile and one or more historical optical profiles of the particular segment, determining a respective drift over time of the respective optical profile of each segment included in one or more other segments of the PON based on respective historical profiles of the each segment, the each segment sharing a respective common endpoint with the particular segment, and comparing the drift over time of the respective optical profile of the particular segment and respective drifts over time of the respective optical profiles of the one or more other segments of the PON. The method further includes identifying, based on the comparison, a component of the PON as requiring maintenance, the identified component being a specific segment endpoint or a specific optical fiber of the PON; and transmitting, to at least one of a user interface or another computing device, an indication of the identified component of the PON requiring maintenance.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
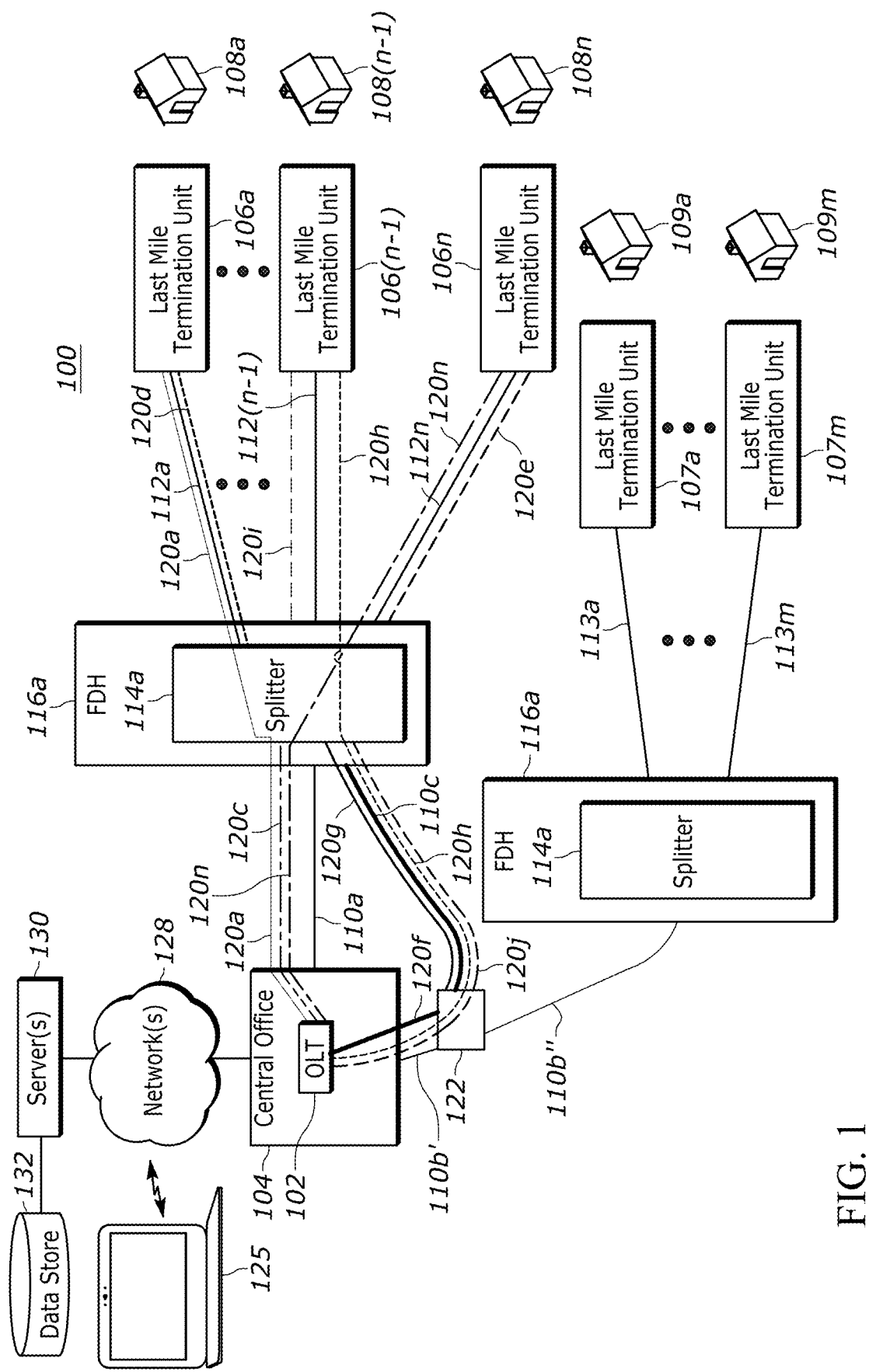
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for managing components of passive optical networks (PONs) by leveraging optical profiles of the PON and/or optical profiles of segments of the PON. Generally speaking, a "segment" of a PON, as utilized herein, has components that include two respective endpoints and one or more optical fibers which optically connect to two endpoints. The endpoints are typically devices within the PON, such an optical line terminal (OLT), a fiber distribution hub (FDH), or a last mile termination unit (e.g., an optical network terminal (ONT) or an optical network unit (ONU) disposed at customer premises).

An "optical profile" of a segment, as utilized herein, generally corresponds to one or more characteristics of optical signals which are delivered over the segment, and may be based on measurements of said signals. For example, the one or more characteristics may correspond to attenuation, changes in frequencies, and/or changes in power outputs of optical signals delivered over the segment. Multiple instances of an optical profile of a segment may be generated over time, and may be utilized to determine the drift over time of the segment's optical profile. The drift over time of the optical profile of the segment may be caused by the aging and normal wear-and-tear of the components of the segment as well as other factors. An optical profile of the PON as a whole may be an aggregation of a majority (if not all) of the optical profiles of segments included in the PON. Similar to optical profiles of segments, multiple instances of the optical profile of the PON as a whole may be obtained over time, and may be utilized to determine the drift over time of the optical profile of the PON as a whole.

The optical profiles of the PON and its segments may be utilized to provide novel systems, methods, and techniques for managing components of PONs. For example, by comparing drifts over time of various segments of the PON and ascertaining the similarities and/or the differences between the different drifts over time, sources of degradations detected within the PON may be more accurately and quickly identified as compared to existing techniques, which commonly mistakenly identify last mile termination units as being sources of detected degradations. Further, such identifications may be remotely accomplished in some scenarios, e.g., without requiring a technician to physically visit customer premises. Still further, optical profiles of the PON and its segments may be utilized to provide other novel component management techniques for the PON, such as predicting times to failure of various components, maintaining components and equipment within the PON, predicting surges in customers contacting technical support, and the like.

Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106a, . . . , 106n at respective customer premises 108a, . . . , 108n. The last mile termination units 106a, . . . , 106n may be located outside and/or inside the customer premises or locations 108a, . . . ,108n. Each last mile termination unit 106a, . . . ,106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . ,106n via respective distribution optical fibers 112a, . . . ,112n (which are interchangeably referred to herein as "F2 optical fibers 112a, . . . ,112n" or "secondary optical fibers 112a, . . . ,112n"). In the illustrated example, the first feeder optical fiber 110a is optically coupled to the plurality of last mile termination units 106a, . . . ,106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . ,108n are proximally close to the FDH 116a, and typically each of the customer premises 108a, . . . ,108n and respective last mile termination units 106a, . . . ,106n is disposed at a different optical distance from the FDH 116a. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m. At some time after the initial installation of the second primary optical fiber 110b, an optical junction 122 has been added in between the OLT 102 and the FDH 116b, and a third primary optical fiber 110c optically connecting the junction 122 to the FDH 116a has been installed. In some implementations, the third primary optical fiber 110c may be a portion of the second primary optical fiber 110b. For instance, a first subset of the entirety of strands of the primary optical fiber 110b that services the optical distance between the OLT 102 and the junction 122 (e.g., as denoted by reference 110b') may be utilized as the third primary optical fiber 110c (and therefore routed or otherwise disposed to optically connect to the FDH 116a instead of to optically connect to the FDH 116b), while a remaining subset of the entirety of strands that service the optical distance between the OLT 102 and the junction 122 (e.g., as denoted by reference 110b") may continue to service the optical distance between the junction 122 and the FDH 116b. In other implementations, the different portions 110b' and 110b" of the primary optical fiber 110b may include the same set of optical strands, and the third primary optical fiber 110c may be an optical fiber that is an entirely different physical optical fiber than the secondary optical fiber 110b. In any case, as shown in the embodiment illustrated in FIG. 1, the OLT 102 may be optically connected to the plurality of last mile termination units 106a-106n via the first primary optical fiber 110a and via the third primary optical fiber 110c. Of course, in other embodiments, more or fewer instances of point-to-multipoint topology used to optically connect the OLT 102 and respective groups of last mile termination units may be possible.

The PON 100 includes a plurality of segments, each of which has a respective pair of segment endpoints which are optically connected by a respective one or more optical fibers. Generally speaking, the endpoints and optical fibers of each segment are collectively referred to within this document as the "components" of each segment. For example, as shown in FIG. 1, components of a first segment 120a include the respective endpoints OLT 102 and last mile termination unit 106a optically connected via the optical fibers 110a, 112a; components of a second segment 120n include the respective endpoints OLT 102 and last mile termination unit 106n optically connected via the optical fibers 110a, 112n; components of a third segment 120c include respective endpoints OLT 102 and FDH 116a optically connected via the optical fiber 110a; components of a fourth segment 120d include respective endpoints FDH 116a and last mile termination unit 106a optically connected via optical fiber 112a; and components of a fifth segment 120e include respective endpoints FDH 116a and last mile termination unit 106n optically connected via optical fiber 112n. As further shown in FIG. 1, components of a sixth segment 120f include respective endpoints OLT 102 and optical junction 122 optically connected via the optical fiber 110b'; components of a seventh segment 120g include respective endpoints optical junction 122 and FDH 116a optically connected via the optical fiber 110c; components of an eighth segment 120h include respective endpoints OLT 102 and last mile termination unit 106(n-1) optically connected via optical fibers 110b', 110c, and 112(n-1), components of a ninth segment 120i include respective endpoints FDH 116a and last mile termination unit 106(n-1) optically connected via optical fiber 112(n-1), and components of a tenth segment 120j include respective endpoints OLT 102 and FDH 116a optically connected via optical fibers 110b' and 110c.

It is noted that some segments may be parts of other segments. For example, segments 120c and 120d are mutually exclusive parts or sub-segments of segment 120a, segments 120f and 120g are mutually exclusive parts or sub-segments of segment 120h and of segment 120j, and segments 120c and 120e are mutually exclusive parts or sub-segments of segment 120n. Additionally, as utilized herein, the term "upstream" refers to a direction towards the central office 104, and the term "downstream" refers to a direction away from the central office 104. As such, for segment 120a, the upstream endpoint is the OLT 102 and the downstream endpoint is the last mile termination unit 106n; for segment 102c, the upstream endpoint is the OLT 102 and the downstream endpoint is the FDH 116a; for segment 120e, the upstream endpoint the FDH 116a and the downstream endpoint is the last mile termination unit 106n, and so on.

In some examples, an optical terminal (e.g., the OLT 102 and/or one or more the last mile termination units 106a, . . . ,106n) transmits optical test signals and/or patterns, indication light, and/or other types of measurement signals into an optical fiber in response to control signals received from a computing device. For example, control signals may be received from a computing device 125 (e.g., a laptop, a computer, a tablet, a mobile phone, etc.) associated with a service technician or other agent of the PON 100. In some examples, the computing device 125 controls an optical terminal via the PON 100, via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc.). Additionally and/or alternatively, control signals may be received from one or more servers 130 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management functionalities of the PON 100.

Various information and data associated with, utilized by, and/or generated by the PON 100 may be stored in the data stores 132. For example, the data store(s) 132 may store records of customer contact events with a technical support organization supporting the PON 100, service call records, records of operating conditions and events which occurred, log books, and the like. Additionally, the data store(s) 132 may store applications which may execute at the one or more servers 130, and/or which may be downloaded or otherwise provided to the technician computing device 125 for installation and execution thereon. Additionally, the data store(s) 132 may store respective optical profiles of one or more segments 120a, 120n, 120c-120e of the PON and an optical profile of the PON 100, which are described in more detail below. Of course, the data store(s) 132 may store any updates to any and all of the information and data stored therein.

Example Optical Profile of the PON

Figure 2:
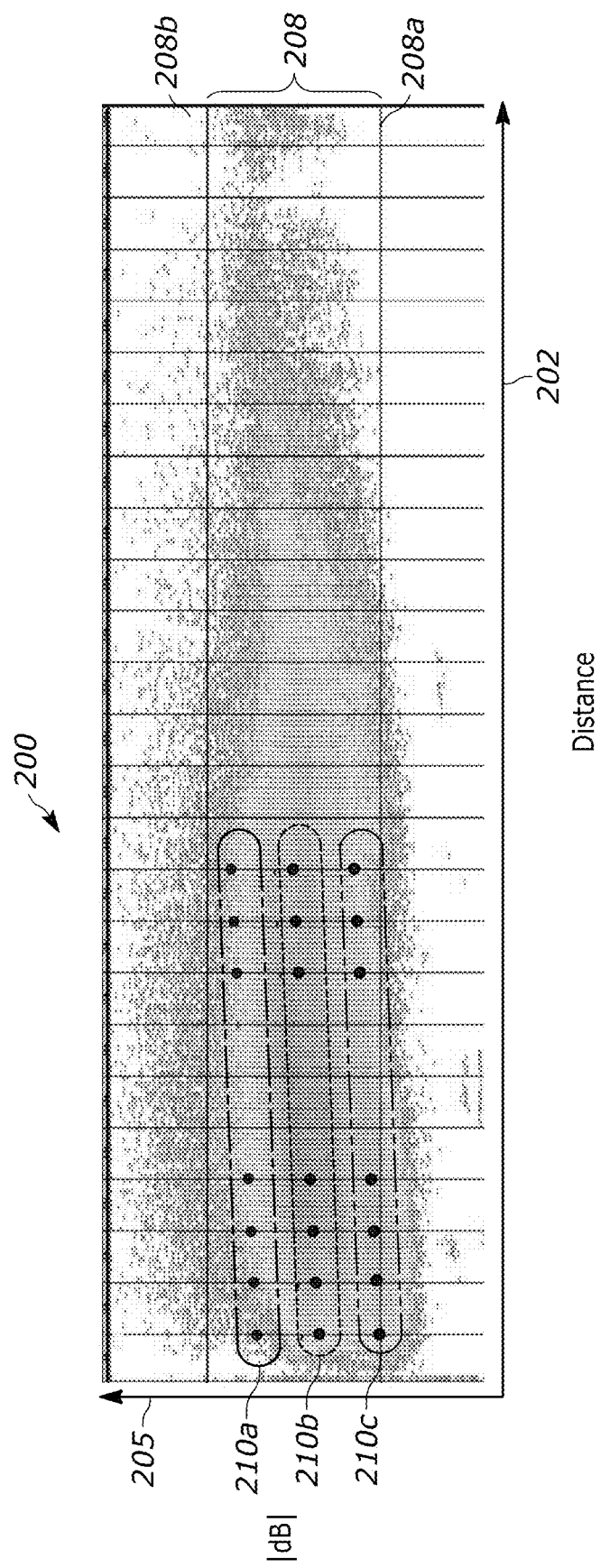
FIG. 2 is an example optical profile of the PON of FIG. 1.

FIG. 2 depicts an example optical profile 200 of the PON 100 of FIG. 1. Generally speaking, the optical profile 200 of the PON 100 provides an indication of the performance of the overall PON 100 or, said another way, an indication of the performance of the PON 100 as a whole, e.g., over a majority (if not all) of the segments of the PON 100. In the embodiment depicted in FIG. 2, the example optical profile 200 utilizes a scatter plot to indicate the performance of the PON 100; however, other indications or representations of the optical profile 200 are possible, such as charts, spreadsheets, tables, other types of graphs or graphical visual representations, etc. Generally, the example optical profile 200 of the PON 100 is generated based on one or more characteristics of optical signals that are delivered throughout the PON 100 over various segments. The one or more characteristics of optical signals may include, for example, an amount, level, or magnitude of attenuation of the optical signals, a variation or change in the frequencies of the optical signals, or a variation in the power output of the optical signals, to name a few. For example, the particular example optical profile 200 of the PON 100 shown in FIG. 2 has been generated based on the characteristic of respective magnitudes of attenuation of optical signals, and as such the optical profile 200 indicates a respective amount, level, or magnitude of attenuation of optical signals delivered over each segment of a plurality of segments of the PON 100. Accordingly, the example optical profile 200 has an x-axis 202 corresponding to optical lengths or distances of segments included in the PON 100 (e.g., in units of miles, kilometers, or other suitable units of length or distance) and a y-axis 205 corresponding to magnitudes (e.g., absolute values) of attenuation (e.g., in units of absolute values of dB or other suitable units), and each data point of the scatter plot is indicative of a respective magnitude or absolute value of optical signal attenuation measured over a respective optical length or distance. The magnitude of attenuation (or any characteristic, for that matter) may be determined based on a test optical signal, indication light, or other suitable measurement signal transmitted by one endpoint of a segment and received at the other endpoint of the segment, where the segment is of a specific optical length or distance. For example, referring simultaneously to FIG. 1 for ease of illustration, the scatter plot 200 may include a respective data point corresponding to each of the segments 120a-120e, each of which has a respective, different optical length, and the magnitude or absolute value of attenuation of optical signals delivered over the respective optical length of each segment is measured or detected at the upstream endpoint, at the downstream endpoint, or both at the upstream and at the downstream endpoints of each segment. It is noted that in FIG. 2, the y-axis 205 is in units of absolute values of attenuation, e.g., |dB|, rather than in units of measured or actual values of attenuation, which typically may be measured, for example, in negative decibels.

In some embodiments, the quantities or densities of last mile termination units 106a, . . . ,106n disposed at locations serviced by the PON 100 (e.g., locations 108a, . . . ,108n) at different optical distances may be graphically represented on the optical profile 200 by color and/or by some other visual characteristic. For example, a green data point may indicate only a single last mile termination unit disposed at a single serviced location at a corresponding optical distance, a yellow data point may indicate that the total number of last mile termination units disposed at one or more serviced locations at a corresponding optical distance is greater than one and less than some number m, a red data point may indicate that the total number of last mile termination units disposed at one or more serviced locations at a corresponding optical distance is greater than or equal to the number m, etc. As such, the quantity and/or density of last mile termination units may be easily indicated on the optical profile 200, e.g., in a visual and/or graphical manner, and/or in other suitable manners. Consequently, in embodiments, the optical profile 200 may be based on the quantity or density of last mile termination units disposed at different locations serviced by the PON 100.

Accordingly, in view of the above, each data point of the optical profile 200 may be indicative of the characteristic of optical signals delivered over a corresponding optical distance. Said another way, each data point may be indicative of the optical profile of a respective one or more segments, where each of the respective one or more segments is of the optical distance corresponding to the data point.

Typically, passive optical networks such as the PON 100 are engineered to meet industry standards, such as the Next-Generation Passive Optical Network 2 standard (e.g., NG-PON2, also referred to as TWDM-PON), the Gigabit-capable Passive Optical Network (G-PON), and 10G-PON (also referred to as XG-PON) developed by the International Telecommunications Union Telecommunication Standardization Sector (ITU-T). Such standards typically specify a target, optimal operating range of attenuations for passive optical networks as a whole, which may be modified for real-time operations based on heuristic data obtained from an operational PON. For example, the PON 100 may have been designed, configured, and built to a standard-specified operating range between negative 15 dB to negative 27 dB. This standard-specified target operating range may be modified based on heuristic data obtained from the PON 100 to arrive at an operational optimal target operating range 208 for the PON 100. For example, based on heuristic data, the operational optimal target operating range 208 for the PON 100 as a whole (which is referred to interchangeably herein as the "designated operating range" 208 of the PON 100 as a whole) may be modified to be between negative 13 dB and negative 28 dB, the boundaries of which are denoted in the optical profile 200 of the PON 100 by references 208a and 208b, respectively. Heuristic data may include, for example, data indicative of occurrences of calls or other moments of contact between PON customers and technical support, technical support dispatches, resolutions of technical support contacts and dispatches, and/or other technical support events.

Generally speaking, segments experiencing magnitudes or absolute values of attenuation below the lower boundary 208a (e.g., the "hot" zone corresponding to more power in the optical signals) are more likely to have optical fibers that wear out more quickly, whereas segments experiencing magnitudes or amounts of attenuation above the upper boundary 208b (e.g., the "cold" zone corresponding to less power in the optical signals) are more likely to be the subject of customer calls and complaints of degraded or poor service. As shown in the optical profile 200 of FIG. 2, a majority of customers and/or of individual segments of the PON 100 are operating within the PON's optimal target operating range 208. As also shown in the optical profile 200, some segments of the PON 200 are experiencing respective magnitudes of attenuation higher and lower than the operational optimal target operating range 208, e.g., as represented by the data points above the upper threshold 208b and by the data points below the lower threshold 208a.

As also shown in FIG. 2, the optical profile 200 indicates the drift of the overall performance of PON 100 as a whole over time, which may reflect the aging of the network's components and optical fibers and the resultant effects on the overall performance of the system 100. In particular, the optical profile 200 depicts an overlay of several snapshots of the network's performance at different times T0, T1, and T2, which are respectively denoted in FIG. 2 by references 210a, 210b, and 210c. For example, reference 210a indicates the performance of the PON 100 at a time T0 corresponding to the initial installation of the PON 100, reference 210b indicates the performance of the PON 100 at a subsequent time T1 after the network 100 has been operating for some duration of time, and reference 210c indicates the performance of the PON 100 at a still subsequent time T2 after the network 100 has been operating for an additional duration of time. Thus, as depicted in FIG. 2, generally speaking, the magnitudes or absolute values of attenuation throughout the PON 100 decrease as the components and optical fibers of the PON 100 age, which is graphically represented in the optical profile 200 of the PON 100.

It is noted that while the drift over time of the optical profile 200 of the PON 100 is graphically depicted in FIG. 2 as an overlay of different instances of the optical profile of the PON 100 over time, this is only one of many possible representations. The drift over time of the optical profile 200 may be additionally or alternatively represented using any other suitable format, such as in charts, tables, spreadsheets, databases, and the like, some of which may include dynamic graphical representations, if desired. Further, the drifts over time of the optical profile 200 of the PON 100 may be additionally or alternately represented in other graphical formats, if desired. For example, the drift over time of the optical profile 200 may be depicted in graphical format in which time is one of the axes, and magnitudes and/or rates of change of the drift with respect to time may be plotted or otherwise represented thereon. Further, it is noted that any of the techniques for determining and indicating the drift over time of optical profiles of the PON 100 as whole may easily be applied to the drift over time of optical profiles of a particular segment of the PON.

Example Scenarios

Advantageously, the systems, methods, and techniques disclosed herein may leverage or otherwise utilize the optical profile of a PON as a whole and/or optical profiles of various segments of the PON to determine or identify a source of a degradation within the PON. To illustrate at least some of the concepts described in this specification, this document provides the following example scenarios which, for ease of discussion, refer simultaneously to FIGS. 1-2 and which may utilize at least portions of the methods described elsewhere within this document. These examples should not be considered limiting in the available functionalities, the order of execution of various actions, the components performing or providing various functionalities, and/or in any other manner. Instead, these examples are intended to introduce various elements, aspects, and/or concepts of the systems and methods described within this document, each of which is described in more detail elsewhere within this document.

In a first example scenario, a customer contacts technical support to report slow or degraded service at the premises 108a at which last mile termination unit 106a is disposed. A technician remotely connects to the networks 128 (e.g., via computing device 125) and instructs an application (e.g., which may execute at the computing device 125 and/or at the servers 130) or executes a service (e.g., which may be hosted at the servers 130) to determine the source of the degradation observed by the customer at the last mile termination unit 106a. Responsive to the technician's instruction, the application or service instructs the last mile termination unit 106a to transmit a test signal to the OLT 102, and instructs the OLT 102 to report the measurements of the received signal (or vice versa). The application/service generates the current optical profile of the segment 120a based on the reported measurements, and determines that the segment's current optical profile is outside of the designated target operating range 208 of the PON 100 or exceeds the upper threshold 208b, thereby confirming the observation of the customer.

Next, to ascertain which particular component within the PON is the source of the detected degradation, the application/service compares the drift over time of the optical profile of the segment 120a with respect to the drifts over time of optical profiles of one or more other segments that share endpoints with the segment 120a. For example, the drift over time of the optical profile of the segment 120a may be compared with the drift over time of the optical profile of the segment 120n, e.g., based on amplitude of drift, rate of drift, etc. In some embodiments, the application/service may determine or generate in-line (e.g., in conjunction with the actions taken to respond to the technician's instruction) a current optical profile of each segment 120a, 120n, and may utilize the current optical profiles in conjunction with historical optical profiles of the segments 120a, 120n stored in the data stores 132 to determine the respective drifts over time of the segments 120a, 120n.

When the difference between compared drifts over time of segments 120a and 120n is within a predefined tolerance range (and particularly when the application/service determines that the current optical profile of the segment 120n also exceeds the upper threshold 208b), the application/service identifies the source of the degradation as being located within the sub-segment that is shared between segments 120a and 120n, i.e., the segment 120c. As such, the candidates for the source of the degradation may be determined to be the components of the segment 120c, i.e., the FDH 116a, the primary optical fiber 110a, and the OLT 102. The application/service may determine the particular source of the detected degradation from among the candidate sources (e.g., from the FDH 116a, the primary optical fiber 110a, and the OLT 102) by, for example, executing additional tests on other segments having the OLT 102 and/or the FDH 116a as respective common endpoints (e.g., to determine respective optical profiles and/or drifts over time), comparing respective drifts over time of optical profiles of other segments with the drift over time of the optical profile of the segment 120a and/or with the drift over time of the optical profile of the segment 120n (e.g., amplitudes and/or rates of drifts over time), comparing the rates of drifts over time of the different components of the segment 120c (e.g., against expected or pre-defined rates of drift over time, and/or against rates of drifts over time of other components of the segment and/or of other segments), switching out/ substituting optical detectors at one or both endpoints and executing additional measurements utilizing the substituted optical detectors for comparison, switching out/substituting various optical components (e.g., the FDH 116a, the primary optical fiber 110a, or the OLT 102) to back-up components and executing additional tests on the substitute configurations, executing component diagnostics on the OLT 102 and/or the FDH 116a, performing local diagnostics on each of the candidate components, taking mitigating actions such as cleaning the end faces of the primary optical fiber 110a, etc. The particular source of degradation may be identified based on the results, e.g., in some cases, by process of elimination based on similarities and discrepancies of the results, and the particular source of degradation may or may not be a component of the segment 120a to which the detected degradation pertained.

On the other hand, when the difference between compared drifts over time of the segments 120a and 120n exceeds the predefined tolerance range (and particularly when the application/service determines that the current optical profile of the segment 120n is within the designated operating range 208 of the network 100), the application/service identifies the source of the degradation as being located within the sub-segment that is included in the segment 120a and that is not shared between the segments 120a and 120n, i.e., the segment 120d. As such, the candidates for the source of the degradation may be determined to be the secondary optical fiber 112a and the last mile termination unit 106a. Upon executing additional tests (such as locally executed component diagnostics for the last mile termination unit 106a), comparing rates of drift over time of the secondary optical fiber 112a and/or the last mile termination unit 106a (e.g., against expected or pre-defined rates of drift over time for similar optical fibers and/or last mile termination units), and/or against rates of drifts over time of other optical fibers and/or last mile termination units of other segments), and/or taking mitigating actions (such as cleaning the end faces of the secondary optical fiber 112a), the source of the detected degradation may be identified to be either the secondary optical fiber 112a or the last mile termination unit 106a, in some cases, by process of elimination based on similarities and discrepancies of the results.

A second example scenario may be similar to the first example scenario; however, instead of a customer contact and a resulting technician instruction being the trigger condition for the application/service to identify the source of the degradation pertaining to segment 120a, a regularly scheduled, automatically-executed diagnostic procedure within the PON 100 (e.g., a diagnostic of the PON 100 as a whole, of a particular component of the PON 100, etc.) receives an abnormal reading and generates an alert corresponding to the segment 120a. The alert triggers the generation and evaluation of the current optical profile of the segment 120a and the comparison of the current optical profile of the segment 120a with the target operating range of the PON 100, and the remainder of the scenario follows as described above for the first example scenario.

A third example scenario may include monitoring the PON to detect whether any components (e.g., endpoints, devices, optical fibers, etc.) require maintenance. Such monitoring may occur on a continual, near-continual, interval, repeated, scheduled, requested, and/or a sporadic basis as desired. For example, current optical profiles of each of the segments included in the PON may be repeatedly (e.g., periodically, in accordance with a maintenance schedule, etc.) determined and ascertained as to whether any of the current optical profiles are outside of (e.g., above or below) the designated operating range of the PON, e.g., the designated operating range 208 of the PON 100. During this monitoring, the current optical profile of a particular segment may be detected as being outside of the designated operating range. Alternately, the current optical profile of a particular segment may be detected as being within the designated operating range of the PON, but at a distance from other optical profiles of other PON segments that is greater than a threshold distance. In response, the drift over time of the particular segment may be determined and compared with drifts over time of other segments which share respective, common endpoints with the particular segment. Based on the comparison, and optionally based on other comparisons and/or tests, a particular component of the PON (e.g., a particular endpoint or a particular optical fiber) may be identified as requiring maintenance, and an indication of such may be provided to a user interface and/or to another computing device. In this manner, the entire PON may be monitored to detect any equipment which may be in need of maintenance. Thresholds corresponding to various tolerance levels may be adjusted to tune levels of sensitivity for detecting various different types, ages, models, etc. of equipment that are in need of maintenance.

Of course, numerous other example scenarios are possible using the systems, methods, and techniques described within this document.

Example Method for Determining a Source of Degradation within a PON

Figure 3:
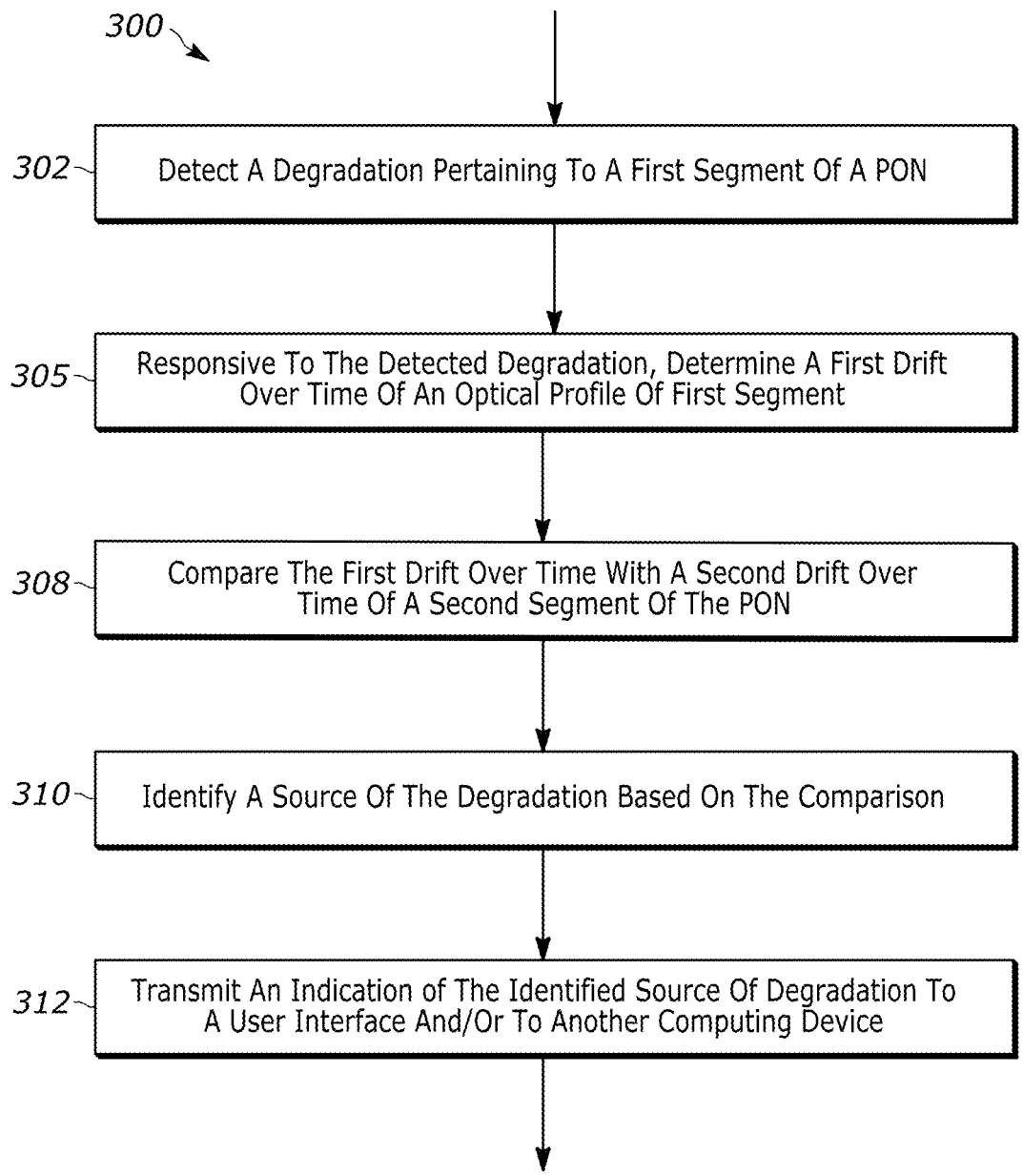
FIG. 3 is a flowchart representative of an example method for determining or identifying a source of degradation within a passive optical network (PON), which may be utilized in the PON of FIG. 1.

FIG. 3 depicts a flow diagram of an example method 300 for determining or identifying a source of a degradation within a passive optical network. For example, the method 300 may be utilized to determine or identify a source of a degradation within the PON 100 of FIG. 1. As is discussed below, the method 300 may leverage or utilize an optical profile of the PON in which the degradation has occurred to determine or identify the source of the degradation. For ease of discussion, and not for limitation purposes, the method 300 is described with simultaneous reference to the PON 100 of FIG. 1 and its example optical profile 200 depicted in FIG. 2, although it is understood that any one or more portions of the method 300 maybe utilized to determine or identify degradation sources within other PONs and by leveraging other types and/or formats of optical profiles thereof.

At a block 302, the method 300 includes detecting a degradation pertaining to a first segment of a PON, where the first segment of the PON includes a respective upstream segment endpoint optically connected to a respective downstream segment endpoint via a respective one or more optical fibers over a first optical distance. For example, the first segment may be one of the segments 120a, 120c-120e, and 120n of PON 100 depicted in FIG. 1.

In embodiments, detecting 302 the degradation pertaining to the first segment of the PON includes detecting that the optical profile of the first segment of the PON (e.g., a current optical profile of the first segment) is above or below a designated operating range (e.g., an operational target operating range) of the PON. For example, detecting 302 the degradation pertaining to the first segment may include detecting that the optical profile of the first segment (e.g., a data point of the optical profile 200 that corresponds to the first segment) is above the designated operating range 208 of the PON 100 or is below the designated operating range 208. The optical profile of the first segment may be a most recent optical profile which was previously generated and stored in a data store associated with the PON, such as the data store(s) 132, or the optical profile of the first segment may be generated in-line with the block 302. Generally speaking, and as discussed in more detail elsewhere within this description, the optical profile of the first segment may be based on one or more characteristics of optical signals delivered over the first segment (e.g., magnitudes of attenuation, changes in frequencies, changes in power outputs, etc.), and may optionally be based on the quantity and/or densities of last mile termination units that, at the time of the generation of the optical profile, are optically connected within the PON 100 via one or more optical fibers that are included in the first segment, where said last mile termination units may be disposed at different optical distances. Some of said last mile termination units may be located at optical distances greater than the optical distance of the first segment. For example, the optical profile of the segment 120c may be based on the quantity and/or the densities of the last mile termination units that are optically connected to the upstream endpoint 102 via the primary optical fiber 110a or, said another way, that are serviced by the primary optical fiber 110a (e.g., last mile termination units 106a, 106n, and other last mile termination units (not shown in FIG. 1) and that are disposed at various optical distances from the upstream endpoint 102, some of which may be at greater optical distances than the optical distance of the segment 120c. The quantity and/or densities of said last mile termination units at their respective optical distances may affect the one or more characteristics of optical signals delivered over the primary optical fiber 110a included in the first segment, and as such, said last mile termination units are categorically referred to herein as "impacting" last mile termination units with respect to the first segment. As such, and referring again to FIG. 1, both of the last mile termination units 106a and 106n are impacting last mile termination units with respect to each of segments 102a, 102c, and 102n; last mile termination unit 106a is an impacting last mile termination unit with respect to each of segments 102a, 102c, 102n, and 102d; and last mile termination unit 102n is an impacting last mile termination unit with respect to each of segments 102a, 102c, 102n, and 102e.

In embodiments, detecting 302 the degradation pertaining to the first segment of the PON may include determining that one or more characteristics of optical signals delivered over the first segment (e.g., a magnitude of attenuation, a variation in frequencies, a change in power outputs, and/or other characteristics) are above a respective upper threshold (e.g., threshold 208b) of the designated operating range of the PON or below a respective lower threshold (e.g., threshold 208a) of the designated operating range. For example, each characteristic may be individually compared against respective upper and lower thresholds, a combination of characteristics may be compared against respective upper and lower thresholds corresponding to the combination, etc.

In embodiments, detecting 302 the degradation pertaining to the first segment of the PON includes detecting that the optical profile of the first segment of the PON (e.g., a current optical profile of the first segment) is within the designated operating range 208 of the PON, and further detecting that a distance between the optical profile of the first segment and the optical profiles of one or more other segments of the PON is greater than a threshold distance. Additionally or alternatively, detecting 302 the degradation pertaining to the first segment of the PON includes detecting that that one or more characteristics of optical signals delivered over the first segment are within the designated operating range 208 of the PON, and further detecting that a distance between the one or more characteristics of optical signals delivered over the first segment and one or more corresponding characteristics of optical signals delivered over one or more other segments of the PON is greater than a threshold distance. Typically, but not necessarily, the one or more other segments include a majority of the other segments of the PON. For example, when the one or more characteristics of optical signals includes a magnitude of attenuation, a degradation associated with the first segment may be detected 302 when a difference between the magnitude of attenuation of optical signals delivered over the first segment of the PON and an average of the respective magnitudes of attenuation of optical signals delivered over each segment included in a majority of other segments of the PON is greater than a threshold distance. The threshold distance may be pre-defined and optionally adjustable. Additionally or alternatively, a total number of other segments included in one or more other segments and/or specific segments included in the one or more other segments may be pre-defined and optionally may be adjustable, if desired.

In some situations, detecting 302 the degradation pertaining to the first segment may be initiated based on the occurrence of a trigger condition, such as the receipt of an indication of an alarm or an alert corresponding to the first segment, the obtaining of a notification indicative of degraded service or performance associated with the first segment, etc. Trigger conditions may be automatically generated (e.g., an alarm, alert, or other type of notification generated by an application or service executing on the computing device 125 or on the one or more servers 130 of the PON 100), and/or trigger conditions may be manually generated (e.g., by a customer logging a complaint of degraded service, a technician manually initiating a maintenance action, etc.).

At a block 305, the method 300 includes, responsive to the detection of the degradation, determining a first drift over time of the optical profile of the first segment of the PON. The first drift over time of the first segment's optical profile may be based on one or more historical optical profiles of the first segment, where the historical optical profiles of the first segment are based on the one or more characteristics of optical signals delivered over the first segment. The historical optical profiles of the first segment may be stored in and obtained from the one or more data stores 132 associated with the PON 100. For example, the historical optical profiles of the first segment may include an initial optical profile of the first segment obtained in conjunction with an installation of the first segment within the PON 100, and one or more additional historical optical profiles of the first segment which were generated or otherwise generated at subsequent times of operation. For instance, the historical optical profiles of the first segment may include specific data points that correspond to the first segment and that are respectively included in the historical optical profiles 210a, 210b, 210c of the PON 100 illustrated in FIG. 2.

At a block 308, the method 300 includes comparing the first drift over time of the first segment with a second drift over time of an optical profile of a second segment of the PON. The second segment includes a respective upstream segment endpoint optically connected to a respective downstream segment endpoint via a respective one or more optical fibers over a second optical distance, and first and the second segments share a common endpoint. The common endpoint between the first and second segments may be a common upstream endpoint or a common downstream endpoint, or the common endpoint may be the upstream endpoint of one of the first and second segments and the downstream endpoint of the other one of the first and second segments. Referring to FIG. 1 to illustrate, examples of pairs of first and second segments which share a common endpoint include segments 120a and 120n, segments 120a and 120c, segments 120c and 120n, segments 120c and 120d, segments 120c and 120e, segments 120a and 120d, segments 120n and 120e, and segments 120d and 120e.

Similar to the first segment, the second drift over time of the optical profile of the second segment may be based on one or more historical optical profiles of the second segment, and the historical optical profiles of the second segment may be based on the one or more characteristics of optical signals delivered over the second segment. That is, both the historical optical profiles of the first segment and the historical optical profiles of the second segment may be based on the one or more characteristics of optical signals. Similar to the optical profiles of the first segment (whether current or historical), the optical profiles of the second segment may optionally correspond to the quantities and/or densities of last mile termination units that, at the time of the generation or determination of the optical profile, are/were optically connected within the PON 100 via one or more optical fibers that are included in the second segment. Similar to the historical optical profiles of the first segment, the historical optical profiles of the second segment may include, for example, an initial optical profile of the second segment obtained in conjunction with an installation of the second segment, and one or more additional historical optical profiles which were generated or otherwise generated at subsequent times.

In some embodiments (not shown in FIG. 3), the method 300 may include determining the second drift over time of the optical profile of the second segment of the PON, or determining at least a portion of the second drift over time. For example, determining the second drift over time of the optical profile of the second segment may be based on historical optical profiles of the second segment stored in the data store(s) 132, and may be performed in a manner similar to that described for determining the first drift over time of the first segment.

At any rate, comparing 308 the first drift over time with the second drift over time may include comparing at least one of respective magnitudes or respective rates of change of the first drift over time and the second drift over time, e.g., to detect and optionally quantify any differences between the magnitudes and/or the rates of change of the first drift over time and the second drift over time. For example, a magnitude of the difference between the first drift over time and the second drift over time may be determined to be within or not within a tolerance range, e.g., plus or minus 0.1 nanometers, or similar. The tolerance ranges may be pre-defined and adjustable, and different tolerance ranges may be defined for different types of comparisons (e.g., magnitudes of drifts, rates of change of drifts, etc.) and/or combinations thereof.

At a block 310, the method 300 includes identifying the source of the degradation corresponding to the first segment based on the comparison, where the source of the degradation is identified as being a particular optical fiber or a particular segment endpoint of the PON. The source of the degradation may or may not be included in the first segment to which the detected degradation pertained. For example, the identified source of the detected degradation may be included in the first segment pertaining to the detected degradation, and as such, may be the upstream endpoint of the first segment, the downstream endpoint of the first segment, or one of the optical fibers optically connecting the upstream endpoint to the downstream endpoint of the first segment. In other scenarios, though, the identified source of the detected degradation is not included in the first segment pertaining to the detected degradation. For example, referring to the example PON 100, if the first segment pertaining to the detected degradation is the segment 120e, the source of the degradation may be identified at the block 310 to be the fiber distribution hub 116a, the primary optical fiber 110a, or the OLT 102.

As such, in some embodiments, the method 300 may include comparing multiple drifts over time of a set of more than two segments of the PON (not shown in FIG. 3). Each segment included in the set of more than two segments may share a common endpoint with at least one other segment included in the set. As such, in some cases, all of the segments included in the set of more than two segments can share a same common endpoint, or different pairs of segments included in the set of more than two segments can share different common endpoints. In these embodiments, identifying 310 the source of the degradation may be based on the comparison of the multiple drifts over time of the set of more than two segments and respective differences therebetween.

Additionally, in embodiments, the method 300 may include determining whether a difference between the first drift over time and the second drift over time is within a defined tolerance range, and identifying 310 the source of the degradation may be based on determination.

In some embodiments (not shown), the method 300 further includes identifying the source of the degradation based on one or more differences between the rates of drifts over time of optical profiles of different components of the segment and the rates of drifts over time of optical profiles of corresponding components of one or more other segments. For example, generally speaking, the rates of drifts over time of optical fibers typically are much slower (e.g., at a lesser rate, which may be orders of magnitudes slower) than the rates of drifts over time of segment endpoints. Thus, by comparing the rates of drifts over time of different optical fibers and/or of different endpoints which are included in the segment and optionally in the one or more other segments, outlier rates of drifts over time of specific, associated components (e.g., optical fibers, types of optical fibers, segment endpoints, and/or types of segment endpoints within the same and/or different segments) may be detected, thereby identifying the source of the degradation within the PON.

At a block 312, the method 300 includes transmitting an indication of the identified source of degradation to at least one of a user interface or another computing device. For example, the method 300 may include transmitting an alert or other suitable notification identifying the source of degradation, and may optionally include transmitting associated information (e.g., measurements and other data collected from the PON 100, optical profiles of associated segments, the optical profile 200 of the PON, etc.) in conjunction with transmitting the indication of the degradation source.

In some embodiments, the method 300 includes displaying, on a user interface, at least one of: an indication of the degradation pertaining to the first segment, an indication of the determined source of the degradation, the optical profile of the first segment, an indication of the first drift over time of the optical profile of the first segment, an indication of the comparison of the first drift over time of the first segment with one or more drifts over time of one or more other segments, the optical profile of the PON as a whole, etc. At least some of the displayed information may be graphical. For example, a graphical representation of the scatter plot 200 may be displayed on a user interface, and by the user clicking, selecting, zooming-in on data associated with particular segments, optical distances, and/or magnitudes of attenuation, more detailed information and/or data associated therewith may be displayed.

In some embodiments (not shown in FIG. 3), the method 300 may include determining the optical profile of the first segment and/or the second segment based on one or more characteristics of optical signals delivered over the respective segment. Determining the optical profile of one or more segments of a PON and of the PON as a whole is described in more detail elsewhere within this description.

Example Method of Maintaining Equipment of a PON

Figure 4:
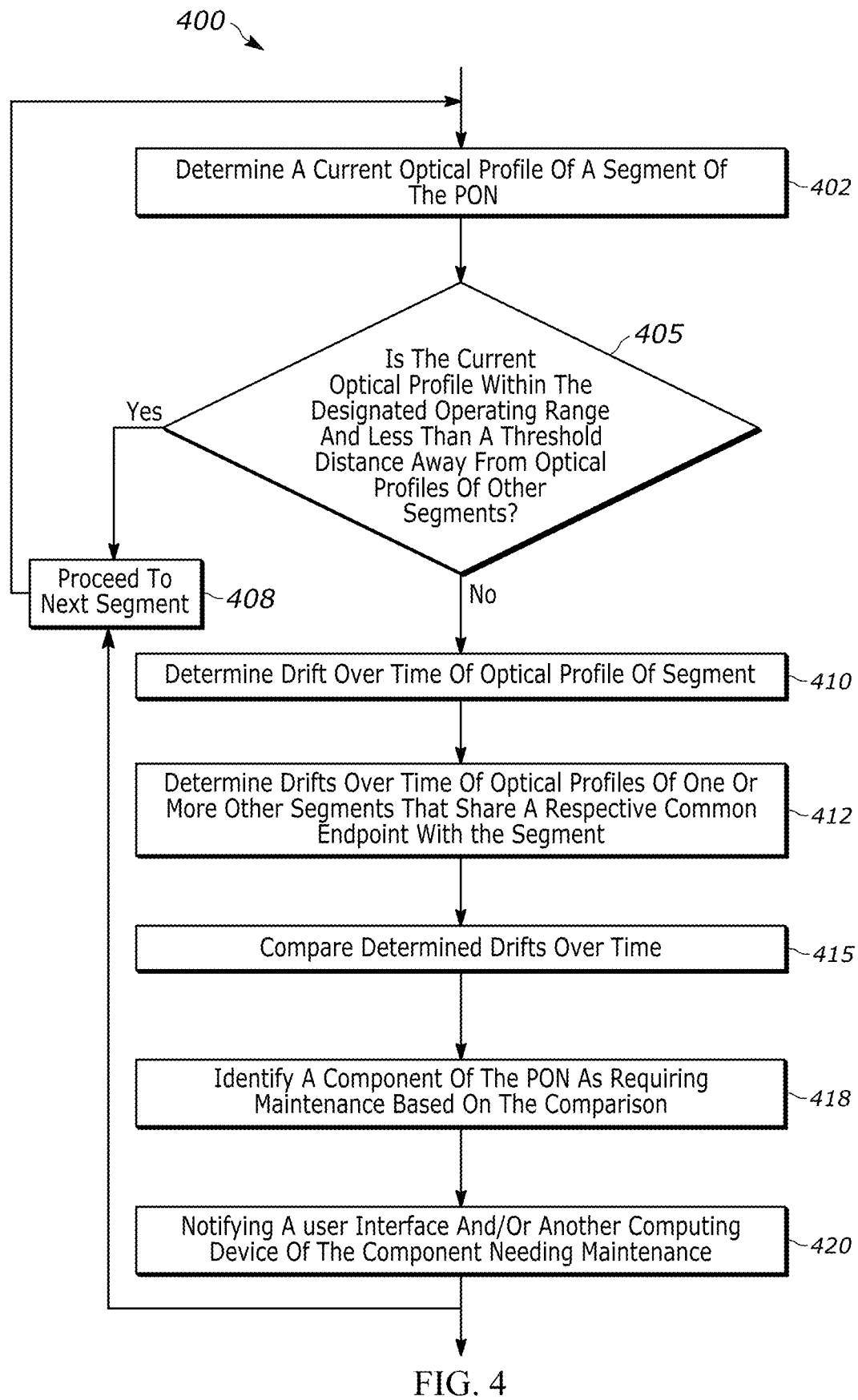
FIG. 4 is a flowchart representative of an example method for maintaining equipment within a passive optical network (PON), which may be utilized in the PON of FIG. 1.

FIG. 4 depicts a flow diagram of an example method 400 for maintaining equipment of a passive optical network. For example, the method 400 may be utilized to automatically detect, determine, and/or identify a PON endpoint, optical fiber, or a device (e.g., from among the endpoints and devices OLT 102, FDH 116a, and last mile termination units 106a, 108n, and the optical fibers 110a, 112a, 112n of the PON 100) that is in need of maintenance or service, in some cases, even prior to the degradation of service and/or prior to occurrences of faults. As is discussed below, the method 400 may leverage or utilize an optical profile of the PON and/or of segments of the PON to detect, determine, and/or identify one or more pieces of equipment that are in need of maintenance within the PON. Accordingly, for ease of discussion, and not for limitation purposes, the method 400 is described with simultaneous reference to the PON 100 of FIG. 1 and the optical profile 200 of FIG. 2, although it is understood that any one or more portions of the method 400 maybe utilized to determine or identify equipment in need of maintenance or service within other PONs and by leveraging other types and/or formats of optical profiles thereof. Additionally, in embodiments, at least a portion of the method 400 may operate in conjunction with at least a portion of the method 300, e.g., with respect to the PON 100, and/or with other methods described herein.

The method 400 includes determining a respective, current optical profile for each segment of a plurality of segments of the PON. For clarity of discussion, and not for limitation purposes, FIG. 4 depicts each segment of the PON being addressed sequentially; however, it is understood that in some implementations, more than one instance of the method 400 may execute simultaneously to address multiple numbers of segments in parallel.

At any rate, at a block 402, the method 400 may include determining a current optical profile of a segment of the PON. The segment may be, for example, one of the segments 120a, 120n, and 120c-120e of the PON 100 depicted in FIG. 1. The current optical profile of the segment may be determined based on one or more characteristics of optical signals that are delivered over the segment, such as attenuation, change in the frequencies of the optical signals, change in the power output of the optical signals, etc., and may optionally be determined based on quantities and/or densities of impacting last mile termination units corresponding to each segment (e.g., last mile termination units that are optically connected to the PON via one or more optical fibers that are included in the segment). Typically, the one or more characteristics of optical signals delivered over the segment may be determined based on measurements obtained at either or both endpoints of the segment. In embodiments, upon determining 402 the current optical profile of the segment of the PON, the method 400 includes storing the determined current optical profile of the segment as an additional historical optical profile of the segment, e.g., in the data stores 130.

At a block 405, the method 400 may include determining whether the determined, current optical profile of the segment is (i) within a designated operating range of the optical profile of the PON as a whole, and (ii) is at a distance from one or more other optical profiles of the PON that is less than a threshold. For example, at the block 405, the method 400 may include determining whether the current optical profile of the segment is not above the upper threshold 208b and is not below the lower threshold 208a of the designated operating range 208 of the PON and if so, whether the current optical profile of the segment is less than a threshold distance from one or more other optical profiles of the PON 100. The one or more other optical profiles typically (but not necessarily) may include a majority of the other optical profiles of the PON 100, such as previously discussed. In some cases, the distance from the one or more other optical profiles of the PON is a distance from an average of the one or more optical profiles of the PON. At any rate, when, at the block 405, the current optical profile of the segment is determined to be both (i) within the designated operating range and (ii) at a distance away from the optical profiles of one or more other segments of the PON that is less than the threshold distance (e.g., the YES leg of block 405), the method 400 may proceed to addressing a next segment of the PON, as denoted by blocks 408 and 402.

On the other hand, when the current optical profile of the segment is determined, at the block 405, to be either outside of the designated operating range or within the designated operating range but at a distance away from the optical profiles of one or more other segments of the PON that is greater than the threshold distance (e.g., the NO leg of block 405), the method 400 may include determining 410 a drift over time of the optical profile of the segment (e.g., of the "subject" segment), and determining 412 respective drifts over time of the optical profiles of one or more other segments of the PON, where each of the one or more other segments shares a respective common endpoint with the subject segment. The determination of the drifts over time of the subject segment and the one or more other segments may be performed by using techniques such as those discussed elsewhere within this document, such as by accessing the data store(s) 132 to obtain respective historical optical profiles and/or related data. The historical optical profiles of each segment may be based on the one or more characteristics of optical signals delivered over the segment at various times which have already occurred, e.g., at the time of the segment's installation (e.g., based on the initial testing of the newly-installed segment) and at other subsequent times during run-time operations of the segment. In some cases, at least some of the historical optical profiles of the segments may be based on the quantities and/or densities of impacting last mile termination units associated with the optical fibers included in the respective segment at each of the times at which a respective historical optical profile of the segment was generated.

At a block 415, the method 400 may include comparing the determined drifts over time of the subject segment and the one or more other segments. For example, the block 415 may include comparing at least one of respective magnitudes or respective rates of change of the drifts over time of the subject segment and of the one or more other segments, e.g., to detect and optionally quantify any differences between the magnitudes, rates of drifts, rates of changes of drifts, etc. In some arrangements, additional tests and/or comparisons of various drifts over time of optical profiles of different segments may be performed, and/or the block 415 may additionally include switching out/substituting optical detectors at one or both endpoints and executing additional measurements utilizing the substituted optical detectors for comparison, switching out/substituting various components (e.g., the FDH 116a, the primary optical fiber 110a, or the OLT 102) to back-up components and executing additional tests on the substitute configurations for further comparisons of resultant drifts over time, etc.

At a block 418, the method 400 includes identifying a component of the PON that is in need of maintenance based on the comparison(s), where the component is a particular optical fiber or a particular segment endpoint of the PON. The component may or may not be included in the segment whose current optical profile was determined to be outside of the designated operating range of the PON (e.g., the subject segment). For example, the component identified as requiring maintenance may be the upstream endpoint of the subject segment, the downstream endpoint of the subject segment, or one of the optical fibers optically connecting the upstream endpoint to the downstream endpoint of the subject segment. In other scenarios, though, the component identified as requiring maintenance is not included in the subject segment. For example, referring to the example PON 100, if the subject segment having the current optical profile outside of the designated operating range is the segment 120e, the source component identified at the block 418 as needing maintenance may be the fiber distribution hub 116a, the primary optical fiber 116a, or the OLT 102.

Identifying 418 a component of the PON that requires maintenance may include, for example, determining that one or more differences between compared drifts over time are outside of (e.g., are above or below, as the case may be) one or more predefined tolerance ranges (e.g., plus or minus 0.1 nanometers, or similar). For example, a magnitude of the difference between a first drift over time and a second drift over time that is not within a respective tolerance range may be indicative of a component requiring maintenance. The tolerance ranges may be predefined and adjustable, and different tolerance ranges may be defined for different types of comparisons (e.g., magnitudes of drifts, rates of change of drifts, etc.), and/or combinations thereof. As previously discussed, in some arrangements, identifying 418 the component in need of maintenance may include multiple pair-wise (and sometimes, logically sequential) comparisons of drifts over time to narrow down the number of possible candidate components that are in need of maintenance. In some embodiments, identifying 418 the component of the PON is in need of maintenance is further based on other actions in addition to the comparing 415 (not shown), such as executing component diagnostics on the OLT 102 and/or the FDH 116a, performing local diagnostics on selected components, taking mitigating actions such as cleaning the end faces of the primary optical fiber 110a, etc. In some embodiments, the block 418 includes identifying more than one component that is in need of maintenance. For example, different tolerance ranges of different types of differences (e.g., magnitude, rate of change, etc.) in drifts over time of optical profiles may be pre-defined for different types of components, ages of components, manufacturers of components, models of components, and the like, and said tolerance ranges may be adjustable to tune sensitivities to the maintenance and service needs of the different components. As such, in some implementations, the comparing 415 performed at the block 415 may result in multiple components being identified 418 as needing maintenance.

In some embodiments (not shown), identifying 418 the component of the PON that is in need of maintenance may include determining one or more differences between the rates of drifts over time of optical profiles of different components of the segment and/or the rates of drifts over time of optical profiles of corresponding components of the one or more other segments. For example, generally speaking, the rates of drifts over time of optical fibers typically are much slower (e.g., at a lesser rate, which may be orders of magnitudes slower) than the rates of drifts over time of segment endpoints. Thus, by comparing the rates of drifts over time of different optical fibers and/or of different endpoints which are included in the segment and optionally in the one or more other segments to determine differences therebetween, outlier rates of drifts over time of specific, associated components (e.g., specific optical fibers and/or specific segment endpoints within the same and/or different segments) may be detected, thereby identifying the component of the PON that is in need of maintenance.

In some embodiments (not shown), the method 400 may include predicting a time-to-failure of the identified component of the PON. Predicting the time-to-failure of the identified component may include determining a time at which a respective optical profile of a segment including the identified component is predicted to move above an upper failure threshold, or is predicted to drift or otherwise move below a lower failure threshold corresponding to the component, e.g., based on a current rate of drift of the respective optical profile, and/or based on other characteristics which may affect the rate of drift (such as greater or fewer last mile termination units being added to the PON, the age of the component and/or of components to which the component is optically connected, the power of the optical signals being delivered over the segment, and the like). Generally speaking, the upper and lower failure thresholds may correspond to thresholds which, when exceeded, are indicative of the component no longer being able to provide a desired quality of service. As the method 400 may be executed continuously or repeatedly across all of the segments of the PON, the upper failure threshold of a component may be greater than the upper threshold 208b of the designated operating range 208, and the lower failure threshold of the component may be less than the lower threshold 208a of the designated operating range 208, but this is not required. Different failure thresholds may be defined for different components, different levels of service, and/or other factors.

In some embodiments, predicting the time-to-failure of the identified component (e.g., above the upper failure threshold) includes performing one or more statistical analyses on a set of historical data indicative of historical technical service incidents pertaining to a specific segment of the PON that includes the identified component and a set of characteristics of the specific segment at the times of the historical technical service incidents. The sets of historical characteristics of the specific segment may include an administrative state, an operational state, a primary service state, a type of equipment, an equipment identifier, an optical distance between an upstream segment endpoint and a downstream segment endpoint of the specific segment, an indication of error correction, a time of installation of the specific segment, the characteristic of optical signals delivered over the specific segment, another characteristic of optical signals delivered over the specific segment; and/or another characteristic of the specific segment, for example. The set of historical data corresponding to the specific segment may be stored in the data stores 130, for example. In some implementations, the set of historical data on which the one or more statistical analyses are performed may additionally or alternatively include data indicative of historical service incidents pertaining to one or more segments that include components similar to the identified component (e.g., in type, age, model, manufacturer, etc.) and corresponding segment characteristics at the times of the historical service incidents.

In embodiments, predicting the time-to failure of the identified component (e.g., below the lower failure threshold) may include performing one or more statistical analyses on a set of historical data indicative of burnout failures of components similar to the identified component (e.g., in type, age, model, manufacturer, etc.) and corresponding segment characteristics at the times of burnout failures. Burnout failures generally refer to failures of components due to excessive power of the optical signals delivered and/or received via the component, and the set of historical data on which the one or more statistical analyses are performed may be stored in the data stores 130.

At any rate, the one or more statistical analyses performed on the set of historical data may determine a subset of the set of characteristics of the specific segment having respective strengths of association with the historical technical service incidents (or with burnout incidents, as the case may be) greater than respective strengths of association of other characteristics included in the set of characteristics of the specific segment. As such, predicting the time-to-failure of the identified component may be based on current values of the subset of the set of characteristics of the specific segment in which the identified component is included, e.g., at the time at which the component was identified as needing maintenance (block 418). For example, the one or more statistical analyses performed on the set of historical data may generate, as an output, a predictive model (e.g., which may be stored in the data stores 130). The current values of the subset of the set of characteristics of the specific segment in which the identified component is included may be input into the predictive model, and the predicted time-to-failure of the identified component may be generated by the predicted model based on the inputs.

At a block 420, the method 400 may include notifying a user interface and/or another computing device or application that the identified component requires maintenance or service. For example, the method 400 may include transmitting an alert or other suitable notification identifying the component in need of maintenance, and may optionally include transmitting associated information (e.g., measurements and other data collected from the PON 100, optical profiles of associated segments, the optical profile 200 of the PON, predicted time-to-failure, etc.) in conjunction with transmitting the indication of the component. If there are remaining PON segments to be addressed and evaluated, the method 400 may proceed to addressing a next segment of the PON, as denoted by blocks 408 and 402.

The determination of the current optical profiles of the PON may be performed automatically and repeatedly, e.g., periodically, at various scheduled times, in accordance with a maintenance schedule, etc. Additionally, the determination of the current optical profiles of the POIN may be performed upon request of another application or service associated with the PON. For example, a diagnostic application or service executing at the servers 130 may request that one or more current optical profiles of various segments of the PON are determined and used to evaluate whether any components of the PON are in need of maintenance. In embodiments, the determination of at least one current optical profile of a corresponding PON segment may performed upon receipt of a user instruction or command. Manual instructions and commands may be generated, for example, remotely by the computing device 125, or locally via a portable user computing device (not shown) that is disposed at locations or premises 108a, 108n.

Further, at least the portions of the method 400 may performed by respective computer-executable instructions (e.g., implemented as applications and/or services) that are executing at the one or more servers 130 and/or at one or more computing devices 125 being operated by technicians of the PON 100.

Generating an Optical Profile of a PON

In some embodiments, the systems and/or methods disclosed herein may generate or determine an optical profile of a PON. For example, the one or more servers 130 may execute particular computer-executable instructions stored thereon and/or stored in the data store(s) to cause an optical profile of the PON 100 to be generated or determined, the method 300 may include generating an optical profile of the PON 100, and/or the method 400 may include generating an optical profile of the PON 100. Of course, systems and methods other than those disclosed herein may also generate or determine optical profiles of PONs. For ease of discussion, though, and not for limitation purposes, generating or determining an optical profile of a PON is described herein with simultaneous reference to the PON 100 of FIG. 1 and the optical profile 200 of FIG. 2.

Generally speaking, generating the optical profile of the PON 100 includes generating an optical profile of each segment of the PON 100, e.g., segments 102a, 102n, and 102c-102e. As previously discussed, an optical profile of a segment is based on one or more characteristics of optical signals delivered over the segment. As such, for each segment, one or more known optical test signals and/or patterns, indication light, and/or other type of measurement signals are transmitted from one endpoint of the segment to the other endpoint of the segment (and optionally, also back to the transmitting endpoint), one or more measurements of the test signal(s) are taken or measured at the receiving endpoint, and one or more optical characteristics of the segment (e.g., amplitudes, frequencies, power outputs, patterns, etc.) are determined from the measurements. Such test signal procedures may be repeated, if desired, any number of times, with different endpoints serving as the transmitting and receiving endpoints, for example. The measurements and/or the optical characteristics may be stored (e.g., in the data store(s) 132) as the optical profile of the segment, along with indications of a time of collection or generation of the segment's optical profile and the optical distance of the segment. Other information may be stored in conjunction with the optical characteristic data, such as the quantities, densities, and/or corresponding optical distances of impacting last mile termination units, equipment and optical fiber identification, etc.

The optical profile of the segment may be determined based only on a single optical characteristic of optical signals delivered over the optical length of the segment (e.g., based on only the magnitude of attenuation of signals transmitted from one endpoint of the segment to the other endpoint of the segment), or may be determined on multiple optical characteristics of optical signals delivered over the optical length of the segment (e.g., based on both the magnitude of attenuation and the amount of variation between the transmitted and received signal frequencies). In some situations, when the optical profile of the segment is based on multiple optical characteristics, different optical characteristics may be weighted differently, if desired.

Accordingly, the optical profile of the PON 100 as a whole may be an aggregation of the optical profiles of a plurality of different optical segments included in the PON 100, and may be represented by using any suitable format, e.g., charts, tables, databases, graphs, etc. A particular graphical representation of the optical profile of the PON 100 (e.g., distance vs. magnitude of attenuation of segments at various times throughout the operation of the PON 100) is depicted in FIG. 2 in a scatter plot format, for example. For example, an instance of the optical profile of the PON 100 201a may be generated upon completion of the initial installation of the PON, and additional instances 210b, 210c may be generated or determined at subsequent times thereafter (e.g., repeatedly) during the run-time operations of the PON 100.

Instances of optical profiles of various segments and/or of the PON as a whole 100 may be generated periodically and/or according to predetermined schedules, on demand in response to manual instructions (e.g., received via the computing device 125 or the server(s) 130), or automatically in response to the occurrence of a trigger condition (e.g., corresponding to a diagnostic or maintenance procedure, installation of additional last mile termination units, replacements of components, and the like). Each generated instance may be stored (e.g., in the data store(s) 132) as a respective historical optical profile of the segment or of the PON (as the case may be) along with associated information corresponding to the configuration of the PON at the time of generation. Stored historical optical profiles of segments and/or of the PON 100 as whole may be accessed by applications and/or services associated with the PON 100, such as those executing on the computing device 125 and/or the one or more servers 130.

Example Processing Platform

Figure 5:
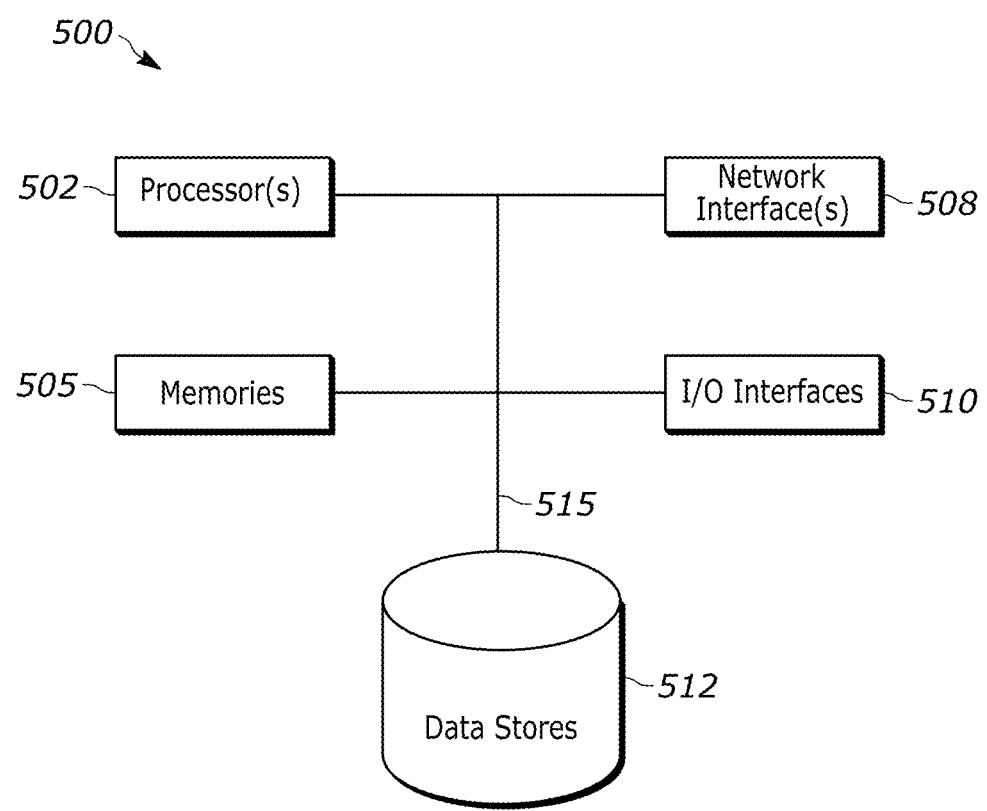
FIG. 5 is a block diagram of an example computing system that may be used to implement the various structures and methods for verifying optical connections, configuring optical connections, identifying optical connections and/or mapping connections of an FDH, in accordance with the disclosure.

FIG. 5 is a block diagram representative of an example logic circuit capable of implementing, for example, one or more components of the example servers 130, an optical terminal (e.g., any of the OLT 102, the last mile termination units 106a, 106n), and/or the example computing system 125. The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform 500 may be, for example, one or more servers, a cloud computing system, a computer, a workstation, a laptop, a mobile device (e.g., a cell phone, a smart phone, a tablet such as an IPAD™), or any other type of computing device or system.

The example processing platform 500 of FIG. 5 includes one or more processors 502, one or more memories 505, one or more network interfaces 508, one or more input/output (I/O) interfaces 510, and/or a set of data stores 512, all of which are interconnected via one or more address/data bus or communication links 615.

The processors 502 of the illustrated example may be implemented using hardware, and may include a semiconductor based (e.g., silicon-based) device. The processors 502 may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors 502 may be a field programmable gate array (FPGA), an application specific integrated circuit (ASIC), etc. that implements operations of the example methods described herein without executing instructions.

The memories 505 are accessible by the processors 502 (e.g., via a memory controller). The example processors 502 interact with the memories 505 to obtain, for example, machine-readable instructions stored in the memories 505 corresponding to, for example, the operations represented by the flowcharts of this disclosure. The example processors 502 may also interact with the memories 505 to store data, such as data formed or used during execution of machine-readable instructions. Example memories 505 include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform 500 to provide access to the machine-readable instructions stored thereon.

The example processing platform 500 of FIG. 5 includes one or more communication interfaces such as, for example, the one or more network interfaces 508, and/or the one or more input/output (I/O) interfaces 510. The communication interface(s) enable the processing platform 500 of FIG. 5 to communicate with, for example, another device, system, etc. (e.g., the OLT 102, the last mile termination units 106a, 106n, the one or more servers 130, the computing device 125, the one or more data stores 132, etc., any other database, and/or any other machine.

The example processing platform 500 of FIG. 5 includes the network interface(s) 508 to enable communication with other machines (e.g., the OLT 102, the last mile termination units 106a, 106n, the one or more servers 130, the computing device 125, etc.) via, for example, one or more networks such as the PON 100 and/or the network(s) 128. The example network interfaces 508 include any suitable type of communication interface(s) (e.g., wired and/or wireless interfaces) configured to operate in accordance with any suitable communication protocol(s). Example network interfaces 508 include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform 500 of FIG. 5 includes the input/output (I/O) interface(s) 510 (e.g., a Bluetooth® interface, a near-field communication (NFC) interface, a universal serial bus (USB) interface, a serial interface, an infrared interface, a PCI express interface, etc.) to enable the processors 502 to communicate with peripheral I/O devices and/or other communication systems. For example, the I/O interface(s) 510 may be used to control a light source, enable receipt of user input (e.g., from a touch screen, a keyboard, a navigation device such as mouse, touch pad, joystick or trackball, a microphone, a button, etc.) and communication of output data (e.g., visual indicators, instructions, data, images, etc.) to the user (e.g., via a display, a speaker, a printer, a communication interface, an antenna, etc.). The I/O interface(s) 510 typically include a graphics driver card, graphics driver chip and/or graphics driver processor to drive a display when a display is present.

In some examples, the processing platform 500 also includes, or is otherwise communicatively coupled to, a set of data stores 512 or other data storage mechanisms (one or more of a HDD, optical storage drive, solid state storage device, CD, CD-ROM, DVD, Blu-ray disk, RAID, data storage bank, etc.). In the illustrated example, the set of data stores 512 may include the example data stores 132.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method of maintaining equipment of a passive optical network (PON), the method comprising determining, for each segment of a plurality of segments of the PON, a respective, current optical profile based on a characteristic of optical signals delivered over the each segment; detecting that the current optical profile of a particular segment of the plurality of segments is above or below a designated operating range of an optical profile of the PON; and responsive to the detection:

determining a drift over time of the respective optical profile of the particular segment based on the current optical profile and one or more historical optical profiles of the particular segment; determining a respective drift over time of the respective optical profile of each segment included in one or more other segments of the PON based on respective historical profiles of the each segment, the each segment sharing a respective common endpoint with the particular segment; comparing the drift over time of the respective optical profile of the particular segment and respective drifts over time of the respective optical profiles of the one or more other segments of the PON; identifying, based on the comparison, a component of the PON as requiring maintenance, the identified component being a specific segment endpoint or a specific optical fiber of the PON; and transmitting, to at least one of a user interface or another computing device, an indication of the identified component of the PON requiring maintenance.

2. The method of example 1, wherein the characteristic of optical signals delivered over the each segment corresponds to attenuation of optical signals delivered over the each segment.

3. The method of any one of the preceding examples, wherein the characteristic of optical signals delivered over the each segment corresponds to changes in frequencies of optical signals delivered over the each segment.

4. The method of any one of the preceding examples, wherein the characteristic of optical signals delivered over the each segment includes changes in power outputs of optical signals delivered over the each segment.

5. The method of any one of the preceding examples, wherein determining the respective, current optical profile of the each segment is based on at least one of a density or a quantity of last mile termination units that are respectively disposed at different locations serviced by the each segment.

6. The method of any one of the preceding examples, wherein the characteristic of optical signals delivered over the particular segment is determined based on measurements of optical signals obtained at one or more of an upstream segment endpoint or a downstream segment endpoint of the particular segment.

7. The method of any one of the preceding examples, wherein identifying the component of the PON as requiring maintenance includes identifying one of a last mile termination unit or a secondary optical fiber optically connecting the last mile termination unit to a remainder of the PON as requiring maintenance.

8. The method of example 7, wherein the last mile termination unit is a downstream segment endpoint of the particular segment.

9. The method of example 7, wherein the last mile termination unit is a downstream segment endpoint of another particular segment.

10. The method of any one of the preceding examples, wherein: the PON includes a distribution hub disposed between an optical line terminal (OLT) and a plurality of last mile termination units; the distribution hub optically connects the OLT to each of the plurality of last mile termination units via a plurality of optical fibers; and identifying the component of the PON as requiring maintenance includes identifying the distribution hub as requiring maintenance.

11. The method of any one of the preceding examples, wherein: the PON includes a distribution hub disposed between an optical line terminal (OLT) and a plurality of last mile termination units; the distribution hub optically connects the OLT to each of the plurality of last mile termination units via a plurality of optical fibers; and identifying the component of the PON as requiring maintenance includes identifying the OLT as requiring maintenance.

12. The method of any one of the preceding examples, wherein comparing the drift over time of the respective optical profile of the particular segment and the respective drifts over time of the respective optical profiles of the one or more other segments includes comparing at least one of respective magnitudes or respective rates of change of the respective optical profile of the particular segment and the respective drifts over time of the respective optical profiles of the one or more other segments.

13. The method of example 12, further comprising determining whether magnitudes of differences between the compared drifts over time are within one or more predefined tolerance ranges; and identifying the component of the PON as requiring maintenance when the magnitudes of differences between the compared drifts over time are not within the one or more predefined tolerance ranges.

14. The method of any one of the preceding examples, further comprising repeatedly determining the respective, current optical profile of the each segment of the plurality of segments over time, and storing the repeatedly determined respective optical profiles of the each segment as additional historical optical profiles of the each segment.

15. The method of example 14, wherein repeatedly determining the respective optical profile of the each segment of the plurality of segments over time includes repeatedly determining the respective profile of the each segment based on a maintenance schedule of the PON.

16. The method of any one of the preceding examples, further comprising predicting a time-to-failure of the identified component of the PON, and providing an indication of the predicted time-to-failure of the identified component in conjunction with the notification that the identified component requires maintenance.

17. The method of any one of the preceding examples, wherein predicting the time-to-failure of the identified component includes determining a time at which a respective optical profile of a segment including the identified component is predicted to be above an upper failure threshold or below a lower failure threshold corresponding to the component.

18. The method of any one of the preceding examples, wherein predicting the time-to-failure of the identified component includes performing one or more statistical analyses on a set of historical data indicative of historical technical service incidents pertaining to a specific segment of the PON that includes the identified component and a set of characteristics of the specific segment to determine a subset of the set of characteristics of the specific segment having respective strengths of association with the historical technical service incidents greater than respective strengths of association of other characteristics included in the set of characteristics of the specific segment; and predicting the time-to-failure of the identified component is based on the subset of the set of characteristics of the specific segment and current values of the subset of the set of characteristics of the specific segment.

19. The method of any one of the preceding examples, wherein the set of characteristics of the specific segment includes one or more of: an administrative state, an operational state, a primary service state, a type of equipment, an equipment identifier, an optical distance between an upstream segment endpoint and a downstream segment endpoint of the specific segment, an indication of error correction, a time of installation of the specific segment, the characteristic of optical signals delivered over the specific segment, another characteristic of optical signals delivered over the specific segment; or another characteristic of the specific segment.

20. A system for maintaining equipment of a passive optical network (PON), the system comprising one or more processors and one or more memories; and computer-executable instructions stored on the one or more memories that, when executed by the one or more processors, cause the system to: determine, for each segment of a plurality of segments of the PON, a respective, current optical profile based on one or more characteristics of optical signals delivered over the each segment; detect that a distance between the current optical profile of a particular segment of the plurality of segments and optical profiles of one or more other segments of the plurality of segments is greater than a threshold distance; and, responsive to the detection:
determine a drift over time of the respective optical profile of the particular segment based on the current optical profile and one or more historical optical profiles of the particular segment; determine a respective drift over time of the respective optical profile of each segment included in one or more other segments of the PON based on respective historical profiles of the each segment, the each segment sharing a respective common endpoint with the particular segment; compare the drift over time of the respective optical profile of the particular segment and respective drifts over time of the respective optical profiles of the one or more other segments of the PON; identify, based on the comparison, a component of the PON as requiring maintenance, the identified component being a specific segment endpoint or a specific optical fiber of the PON; and notify at least one of a user interface or another computing device that the identified component of the PON requires maintenance.

21. The system of example 20, wherein the one or more characteristics of optical signals delivered over the each segment corresponds to at least one of attenuation, changes in frequencies, or changes in power outputs of optical signals delivered over the each segment.

22. The system of example 21, wherein the determination of the respective, current optical profile of the each segment is further based on at least one of a density or a quantity of last mile termination units that are respectively disposed at different locations serviced by the each segment.

23. The system of any one of examples 20-22, wherein the one or more characteristics of optical signals delivered over the particular segment is determined based on at least one of measurements of optical signals obtained at one or more of an upstream segment endpoint or a downstream segment endpoint of the particular segment.

24. The system of example 23, wherein:
the upstream endpoint of the particular segment is one of an optical line terminal (OLT) or a distribution hub disposed between the optical line terminal (OLT) and a plurality of last mile termination units; and
the downstream endpoint of the particular segment is one of the distribution hub or a last mile termination unit included in the plurality of last mile termination units.

25. The system of any one of examples 20-22, wherein the component identified as requiring maintenance is excluded from the particular segment.

26. The system of any one of examples 20-22, wherein the component identified as requiring maintenance is included in the particular segment.

27. The system of any one of examples 20-22, wherein:
the PON includes a distribution hub disposed between an optical line terminal (OLT) and a plurality of last mile termination units;
the distribution hub optically connects the OLT to each of the plurality of last mile termination units via a plurality of optical fibers; and
identifying the component of the PON as requiring maintenance includes identifying the distribution hub as requiring maintenance.

28. The system of any one of examples 20-22, wherein:
the PON includes a distribution hub disposed between an optical line terminal (OLT) and a plurality of last mile termination units;
the distribution hub optically connects the OLT to each of the plurality of last mile termination units via a plurality of optical fibers; and
identifying the component of the PON as requiring maintenance includes identifying the OLT as requiring maintenance.

29. The system of any one of examples 20-22, wherein the comparison of the drift over time of the respective optical profile of the particular segment and the respective drifts over time of the respective optical profiles of the one or more other segments includes a comparison of at least one of respective magnitudes or respective rates of change of the respective optical profile of the particular segment and the respective drifts over time of the respective optical profiles of the one or more other segments.

30. The system of any one of examples 20-22, wherein:
the computer-executable instructions are further executable to cause the system to determine whether magnitudes of differences between the compared drifts over time are within one or more predefined tolerance ranges; and
the component of the PON is identified as requiring maintenance when the magnitudes of differences between the compared drifts over time are not within the one or more predefined tolerance ranges.

31. The system of any one of examples 20-22, wherein the computer-executable instructions are further executable to cause the system to repeatedly determine the respective, current optical profile of the each segment of the plurality of segments over time, and store the repeatedly determined respective optical profiles of the each segment as additional historical optical profiles of the each segment.

32. The system of example 31, wherein the repeated determination of the current optical profiles of the plurality of segments is based on a maintenance schedule of the PON.

33. The system of any one of examples 20-32, wherein the one or more other segments of the plurality of segments is a majority of the plurality of segments.

34. The system of any one of examples 20-33, wherein the distance between the current optical profile of the particular segment and the optical profiles of the one or more other segments is a distance between the current optical profile of the particular segment and an average of the optical profiles of the one or more other segments.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of maintaining equipment of a passive optical network (PON), the method comprising:
determining, for each segment of a plurality of segments of the PON, a respective, current optical profile based on a characteristic of optical signals delivered over the each segment;
detecting that the current optical profile of a particular segment of the plurality of segments is above or below a designated operating range of an optical profile of the PON; and
responsive to the detection:
determining a drift over time of the respective optical profile of the particular segment based on the current optical profile and one or more historical optical profiles of the particular segment;
determining a respective drift over time of the respective optical profile of each segment included in one or more other segments of the PON based on respective historical profiles of the each segment, the each segment sharing a respective common endpoint with the particular segment;
comparing the drift over time of the respective optical profile of the particular segment and respective drifts over time of the respective optical profiles of the one or more other segments of the PON;
identifying, based on the comparison, a component of the PON as requiring maintenance, the identified component being a specific segment endpoint or a specific optical fiber of the PON; and transmitting, to at least one of a user interface or another computing device, an indication of the identified component of the PON requiring maintenance.

2. The method of claim 1, wherein the characteristic of optical signals delivered over the each segment corresponds to attenuation of optical signals delivered over the each segment.

3. The method of claim 1, wherein the characteristic of optical signals delivered over the each segment corresponds to changes in frequencies of optical signals delivered over the each segment.

4. The method of claim 1, wherein the characteristic of optical signals delivered over the each segment includes changes in power outputs of optical signals delivered over the each segment.

5. The method of claim 1, wherein determining the respective, current optical profile of the each segment is based on at least one of a density or a quantity of last mile termination units that are respectively disposed at different locations serviced by the each segment.

6. The method of claim 1, wherein identifying the component of the PON as requiring maintenance includes identifying one of a last mile termination unit or a secondary optical fiber optically connecting the last mile termination unit to a remainder of the PON as requiring maintenance.

7. The method of claim 6, wherein the last mile termination unit is a downstream segment endpoint of the particular segment.

8. The method of claim 6, wherein the last mile termination unit is a downstream segment endpoint of another particular segment.

9. The method of claim 1, wherein:
the PON includes a distribution hub disposed between an optical line terminal (OLT) and a plurality of last mile termination units;
the distribution hub optically connects the OLT to each of the plurality of last mile termination units via a plurality of optical fibers; and
identifying the component of the PON as requiring maintenance includes identifying the distribution hub as requiring maintenance.

10. The method of claim 1, wherein:
the PON includes a distribution hub disposed between an optical line terminal (OLT) and a plurality of last mile termination units;
the distribution hub optically connects the OLT to each of the plurality of last mile termination units via a plurality of optical fibers; and
identifying the component of the PON as requiring maintenance includes identifying the OLT as requiring maintenance.

11. The method of claim 1, wherein comparing the drift over time of the respective optical profile of the particular segment and the respective drifts over time of the respective optical profiles of the one or more other segments includes comparing at least one of respective magnitudes or respective rates of change of the respective optical profile of the particular segment and the respective drifts over time of the respective optical profiles of the one or more other segments.

12. The method of claim 1, further comprising:
determining whether magnitudes of differences between the compared drifts over time are within one or more predefined tolerance ranges; and
identifying the component of the PON as requiring maintenance when the magnitudes of differences between the compared drifts over time are not within the one or more predefined tolerance ranges.

13. The method of claim 1, further comprising repeatedly determining the respective, current optical profile of the each segment of the plurality of segments over time, and storing the repeatedly determined respective optical profiles of the each segment as additional historical optical profiles of the each segment.

14. The method of claim 1, further comprising predicting a time-to-failure of the identified component of the PON, and providing an indication of the predicted time-to-failure of the identified component in conjunction with the notification that the identified component requires maintenance.

15. The method of claim 14, wherein predicting the time-to-failure of the identified component includes determining a time at which a respective optical profile of a segment including the identified component is predicted to be above an upper failure threshold or below a lower failure threshold corresponding to the component.

16. The method of claim 14, wherein predicting the time-to-failure of the identified component includes:
performing one or more statistical analyses on a set of historical data indicative of historical technical service incidents pertaining to a specific segment of the PON that includes the identified component and a set of characteristics of the specific segment to determine a subset of the set of characteristics of the specific segment having respective strengths of association with the historical technical service incidents greater than respective strengths of association of other characteristics included in the set of characteristics of the specific segment; and
predicting the time-to-failure of the identified component is based on the subset of the set of characteristics of the specific segment and current values of the subset of the set of characteristics of the specific segment.

17. The method of claim 16, wherein the set of characteristics of the specific segment includes one or more of: an administrative state, an operational state, a primary service state, a type of equipment, an equipment identifier, an optical distance between an upstream segment endpoint and a downstream segment endpoint of the specific segment, an indication of error correction, a time of installation of the specific segment, the characteristic of optical signals delivered over the specific segment, another characteristic of optical signals delivered over the specific segment; or another characteristic of the specific segment.

18. A system for maintaining equipment of a passive optical network (PON), the system comprising:
one or more processors and one or more memories; and
computer-executable instructions stored on the one or more memories that, when executed by the one or more processors, cause the system to:
determine, for each segment of a plurality of segments of the PON, a respective, current optical profile based on a characteristic of optical signals delivered over the each segment;
detect that a distance between the current optical profile of a particular segment of the plurality of segments and the current optical profiles of one or more other segments of the plurality of segments is greater than a threshold distance; and
responsive to the detection:
determine a drift over time of the respective optical profile of the particular segment based on the current optical profile and one or more historical optical profiles of the particular segment;
determine a respective drift over time of the respective optical profile of each segment included in one or more other segments of the PON based on respective historical profiles of the each segment, the each segment sharing a respective common endpoint with the particular segment;

compare the drift over time of the respective optical profile of the particular segment and respective drifts over time of the respective optical profiles of the one or more other segments of the PON;

identify, based on the comparison, a component of the PON as requiring maintenance, the identified component being a specific segment endpoint or a specific optical fiber of the PON; and notify at least one of a user interface or another computing device that the identified component of the PON requires maintenance.

19. The system of claim 18, wherein the characteristic of optical signals delivered over the each segment corresponds to at least one of attenuation, changes in frequencies, or changes in power outputs of optical signals delivered over the each segment.

20. The system of claim 19, wherein the determination of the respective, current optical profile of the each segment is further based on at least one of a density or a quantity of last mile termination units that are respectively disposed at different locations serviced by the each segment.

21. The system of claim 18, wherein the characteristic of optical signals delivered over the particular segment is determined based on at least one of measurements of optical signals obtained at one or more of an upstream segment endpoint or a downstream segment endpoint of the particular segment.

22. The system of claim 21, wherein:

the upstream endpoint of the particular segment is one of an optical line terminal (OLT) or a distribution hub disposed between the optical line terminal (OLT) and a plurality of last mile termination units; and the downstream endpoint of the particular segment is one of the distribution hub or a last mile termination unit included in the plurality of last mile termination units.

23. The system of claim 18, wherein the component identified as requiring maintenance is excluded from the particular segment.

24. The system of claim 18, wherein the component identified as requiring maintenance is included in the particular segment.

25. The system of claim 18, wherein:

the PON includes a distribution hub disposed between an optical line terminal (OLT) and a plurality of last mile termination units;

the distribution hub optically connects the OLT to each of the plurality of last mile termination units via a plurality of optical fibers; and the component of the PON identified as requiring maintenance is the distribution hub.

26. The system of claim 18, wherein:

the PON includes a distribution hub disposed between an optical line terminal (OLT) and a plurality of last mile termination units;

the distribution hub optically connects the OLT to each of the plurality of last mile termination units via a plurality of optical fibers; and the component of the PON identified as requiring maintenance is the OLT.

27. The system of claim 18, wherein the computer-executable instructions are further executable to cause the system to repeatedly determine the respective, current optical profile of the each segment of the plurality of segments over time, and store the repeatedly determined respective optical profiles of the each segment as additional historical optical profiles of the each segment.

28. The system of claim 27, wherein the repeated determination of the current optical profiles of the plurality of segments is based on a maintenance schedule of the PON.

29. The system of claim 18, wherein the one or more other segments of the plurality of segments is a majority of the plurality of segments.

30. The system of claim 18, wherein the distance between the current optical profile of the particular segment and the current optical profiles of the one or more other segments is a distance between the current optical profile of the particular segment and an average of the current optical profiles of the one or more other segments.

* * * * *